US005916653A

United States Patent [19]

Kunstadter et al.

[11] Patent Number: 5,916,653

[45] Date of Patent: Jun. 29, 1999

[54] DENTAL DECALS AND METHOD OF APPLICATION

[76] Inventors: Maria A. Kunstadter; Michael K. Sigler, both of 5730 Ward Pkwy., Kansas City, Mo. 64113

[21] Appl. No.: 08/919,020

[22] Filed: Aug. 27, 1997

[51] Int. Cl.[6] .................................. A61C 5/00; G09F 3/10

[52] U.S. Cl. .......................... 428/42.1; 132/285; 132/319; 428/40.1; 428/41.3; 428/41.8; 428/42.2; 428/42.3; 428/914; 433/203.1; 433/217.1; 433/229

[58] Field of Search .................................. 428/40.1, 41.3, 428/41.8, 42.1, 42.2, 42.3, 914; 433/229, 217.1, 203.1; 132/285, 319

[56] References Cited

U.S. PATENT DOCUMENTS 4,239,261 12/1980 Richardson ............................. 433/229

4,861,268 8/1989 Garay ...................................... 433/229

FOREIGN PATENT DOCUMENTS 1187364 5/1985 Canada .................................. 433/229

385792 9/1990 European Pat. Off. ............... 433/229

86/00213 1/1986 WIPO ................................... 433/229

*Primary Examiner*—Nasser Ahmad

*Attorney, Agent, or Firm*—Hovey, Williams, Timmons & Collins

[57] ABSTRACT

A dental decal (10) for application on a person's tooth (24) is disclosed. The dental decal includes a substrate (12) formed of non-toxic, moisture-resistant polyethylene film material, a design (18) printed on one face of the substrate with non-toxic ink, and a layer of non-toxic, ingestible, medical grade adhesive (20) on the other face of the substrate for permitting the dental decal to be firmly affixed to the person's tooth.

12 Claims, 1 Drawing Sheet

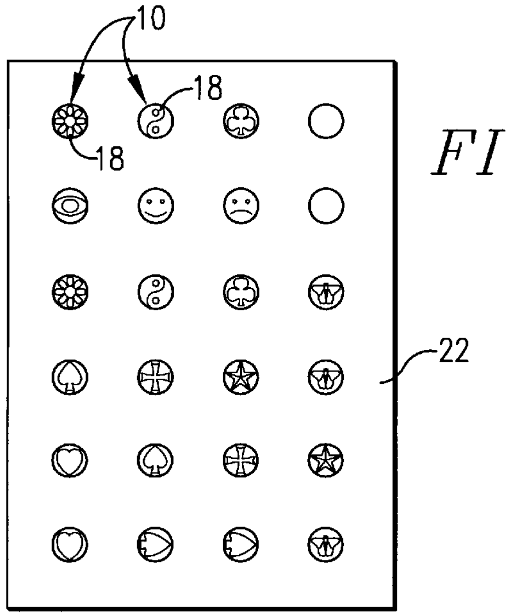
FIG. 1.
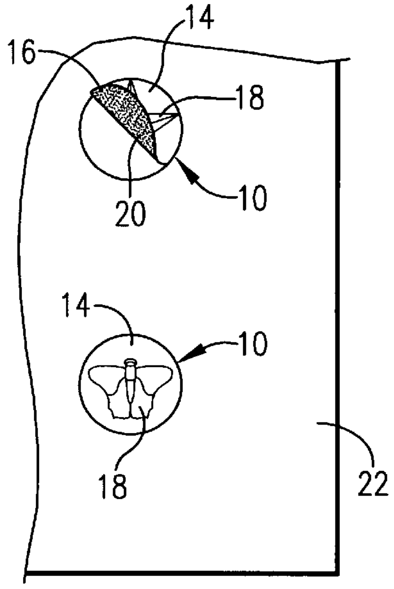
FIG. 2.
FIG. 3.
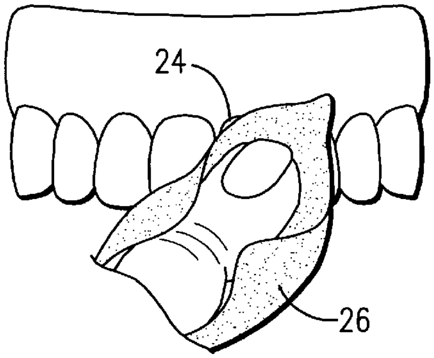
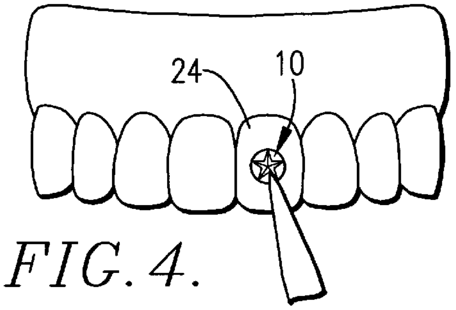
FIG. 4.
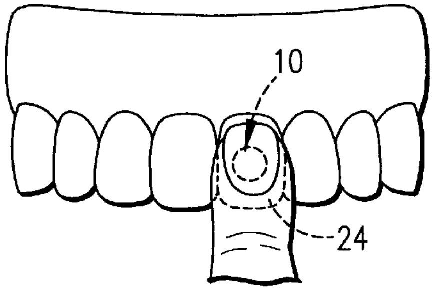
FIG. 5.
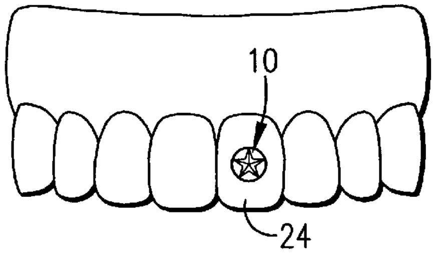
FIG. 6.

DENTAL DECALS AND METHOD OF APPLICATION

BACKGROUND OF THE INVENTION

1. Field of the Invention

The present invention relates to decals having designs printed thereon. More particularly, the invention relates to a dental decal that is sized to fit on a person's tooth, that is easy to apply and to remove, and that is formed of non-toxic, ingestible, moisture-proof materials.

2. Description of the Prior Art

Many people enjoy adorning themselves with colorful decals or tattoos. Unfortunately, decals do not adhere well to skin, and tattoos are somewhat painful, difficult, and expensive to apply and cannot be easily removed. Thus, a need exists for a method for applying designs to a person's body that is more permanent than traditional decals yet that does not suffer from the limitations of tattoos.

OBJECTS AND SUMMARY OF THE INVENTION

The present invention solves the above-described limitations of prior art tattoos and conventional decals and provides a distinct advance in the state of the art by providing a dental decal that can be adhered to a person's tooth. The dental decal of the present invention broadly includes: a substrate sized to fit on a person's tooth and presenting opposed front and rear faces; a design printed on the front face of the substrate; and a layer of non-toxic, moisture-resistant adhesive on the rear face of the substrate for permitting the substrate to be adhered to the person's tooth.

The substrate is preferably circular in shape and presents a diameter of approximately 3.5–4 mm so that it easily fits within the boundaries of the front surface of a person's tooth. The substrate is formed of non-toxic, moisture-resistant polyethylene film material. The design is printed on the substrate with non-toxic ingestible ink, and the adhesive is medical grade, non-toxic, and moisture-resistant. Thus, the dental decal can be firmly affixed to a person's tooth yet is not harmful even if it is accidentally swallowed.

A plurality of the dental decals are releasably carried on a sheet of backing material. The decals may have any design printed thereon, and each sheet of backing material preferably carries decals having several different designs.

A dental decal formed in accordance with the present invention is applied to a tooth by merely drying the tooth, removing the desired dental decal from the sheet of release backing material, and pressing the dental decal firmly on the tooth to adhere it to the tooth. Once applied, the dental decal will typically remain firmly affixed on a tooth approximately 4–8 hours if it is not disturbed. When the person desires to remove the dental decal, it can be merely peeled off and thrown away, and replaced with a new decal if desired.

BRIEF DESCRIPTION OF THE DRAWING FIGURES

A preferred embodiment of the present invention is described in detail below with reference to the attached drawing figures, wherein:

FIG. 1 illustrates a plurality of dental decals formed in accordance with a preferred embodiment of the present invention releasably carried on a sheet of backing material;

FIG. 2 is an enlarged fragmentary view of FIG. 1 showing two of the dental decals in more detail and showing the removal of one of the dental decals from the sheet of release backing material;

FIG. 3 illustrates the preparation of a tooth for receiving a dental decal;

FIG. 4 illustrates the application of the dental decal to the prepared tooth;

FIG. 5 illustrates the dental decal being pressed on the tooth; and

FIG. 6 illustrates the dental decal after it has been fully applied to the tooth.

DETAILED DESCRIPTION OF THE PREFERRED EMBODIMENTS

The drawing figures illustrate a plurality of dental decals 10 constructed in accordance with a preferred embodiment of the present invention. As best illustrated in FIG. 2, each dental decal includes a substrate 12 presenting opposed front and rear faces 14,16, respectively. The substrate is preferably circular in shape and presents a diameter of 2.5–5 mm, and preferably 3.5–4 mm, so that it easily fits on the front surface of a person's tooth. The substrate is preferably formed of non-toxic, hypoallergenic, moisture-resistant polyethylene film material having a thickness of approximately 0.04 mm. One such material is manufactured by the 3M Corporation under the name "3M Plastic Medical Tape", No. 9830.

The front face 14 of each substrate 12 includes a design 18 printed thereon with non-toxic, water-resistant ink. One type of ink that may be used for printing the design is manufactured by the Water Ink Technologies, Inc. under the name "X-Cel Film System". The designs may include hearts, stars, sports logos, or any other patterns including those illustrated in FIG. 1.

The rear face 16 of each substrate 12 includes a layer of adhesive 20 coated thereon. The adhesive is preferably non-toxic, hypoallergenic, moisture resistant and pressure-sensitive acrylate. The adhesive firmly bonds the substrate to a tooth without being harmful if swallowed as described in more detail below. One type of adhesive that may be coated on the substrate is manufactured by the 3M Corporation under the name "Hypoallergenic, Pressure-Sensitive Acrylate".

A plurality of the dental decals 10 are preferably releasably carried on a sheet of backing material 22 as illustrated in FIGS. 1 and 2. The backing material is preferably polyethylene coated, bleached Kraft paper coated with silicone on the side of the decals 10 and having a thickness of approximately 0.12 mm. The dental decals may be arranged in a series of rows and columns on the backing material to facilitate their removal from the sheet of backing material. Each sheet of release backing material preferably carries dental decals having a number of different designs.

FIGS. 3–6 illustrate the application of one of the dental decals 10 to a person's tooth 24. The tooth is first dried with a tissue 26 or towel as illustrated in FIG. 3. The desired dental decal is then peeled off the sheet of release backing material 22 as illustrated in FIG. 2. The rear face 16 of the decal is then placed on the front surface of the tooth as illustrated in FIG. 4 so that the adhesive layer 20 contacts the tooth. Finally, the dental decal is firmly pressed on the tooth until it is firmly adhered to the tooth as illustrated in FIG. 5.

Once the dental decal 10 has been applied to the tooth 24 as illustrated in FIG. 6, it will typically remain on the tooth approximately 4–8 hours if it is not disturbed. Since, the substrate 12 and adhesive 20 are moisture-resistant, the dental decal 10 will remain firmly adhered to the tooth even when exposed to moisture. Moreover, since the substrate, ink, and adhesive are formed of non-toxic, ingestible material, the dental decal is not harmful even if accidentally swallowed. When the person desires to remove the dental decal, it can be merely peeled off and thrown away. The person may replace the dental decal with a new dental decal having a different design if desired.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A dental decal consisting of:

a flexible substrate sized to fit within the confines of the front surface of a person's tooth and presenting opposed front and rear faces;

a design printed on the front face of the substrate; and a bonding agent for removably attaching the substrate to the tooth, the bonding agent consisting essentially of a layer of non-toxic, moisture-resistant adhesive pre-applied to the rear face of the substrate for permitting the substrate to be adhered to the person's tooth so that the substrate can be easily placed on the tooth and then easily removed from the tooth.

2. The dental decal as set forth in claim 1, the substrate being circular in shape.

3. The dental decal as set forth in claim 2, the substrate presenting a diameter of approximately 2.5–5 mm.

4. The dental decal as set forth in claim 2, the substrate presenting a diameter of approximately 3.5–4 mm.

5. The dental decal as set forth in claim 1, the design being printed on the front face of the substrate with non-toxic ink.

6. The dental decal as set forth in claim 1, the substrate being formed of non-toxic polyethylene film material.

7. A tooth decorating kit consisting of:

a sheet of release backing material; and a plurality of dental decals releasably carried on the sheet of backing material, each of the dental decals including a flexible substrate sized to fit within the confines of the front surface of a person's tooth and presenting opposed front and rear faces;

a design printed on the front face of the substrate; and a bonding agent for removably attaching the substrate to the tooth, the bonding agent consisting essentially of a layer of non-toxic, moisture-resistant adhesive pre-applied to the rear face of the substrate for permitting the substrate to be adhered to the person's tooth so that the substrate can be easily placed on the tooth and then easily removed from the tooth.

8. The tooth decorating kit as set forth in claim 7, the substrate being circular in shape.

9. The tooth decorating kit as set forth in claim 8, the substrate presenting a diameter of approximately 2.5–5 mm.

10. The tooth decorating kit as set forth in claim 8, the substrate presenting a diameter of approximately 3.5–4 mm.

11. The tooth decorating kit as set forth in claim 7, the design being printed on the front face of the substrate with non-toxic ink.

12. The tooth decorating kit as set forth in claim 7, the substrate being formed of non-toxic polyethylene film material.

* * * * *